F. MODLIN.
AUTO TIRE.
APPLICATION FILED OCT. 8, 1909.

969,389.

Patented Sept. 6, 1910.

Witnesses

Inventor
Frank Modlin,
By C. A. Snow & Co.
Attorneys

UNITED STATES PATENT OFFICE.

FRANK MODLIN, OF SIOUX CITY, IOWA.

AUTO-TIRE.

969,389.  Specification of Letters Patent.  Patented Sept. 6, 1910.

Application filed October 8, 1909. Serial No. 521,656.

*To all whom it may concern:*

Be it known that I, FRANK MODLIN, a citizen of the United States, residing at Sioux City, in the county of Woodbury and State of Iowa, have invented a new and useful Auto-Tire, of which the following is a specification.

This invention relates to tires for automobiles and the like and its object is to provide a device of this character which dispenses with the use of pneumatic tires but which resiliently supports the tread of the wheel so as to absorb all jolts produced by traveling over a rough or uneven surface.

Another object is to provide a tire, the parts of which will not readily get out of order and can be easily taken apart or assembled.

With these and other objects in view, the invention consists in certain novel details of construction and the combinations of parts hereinafter more fully described and pointed out in the claims.

In the accompanying drawings the preferred form of the invention has been shown.

Figure 1:
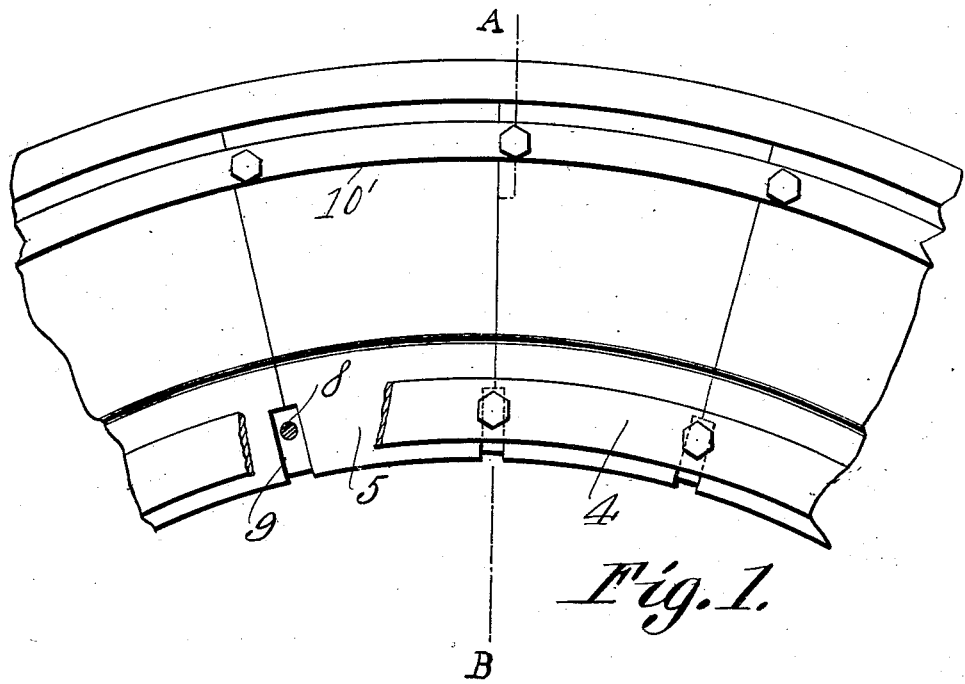
Figure 2:
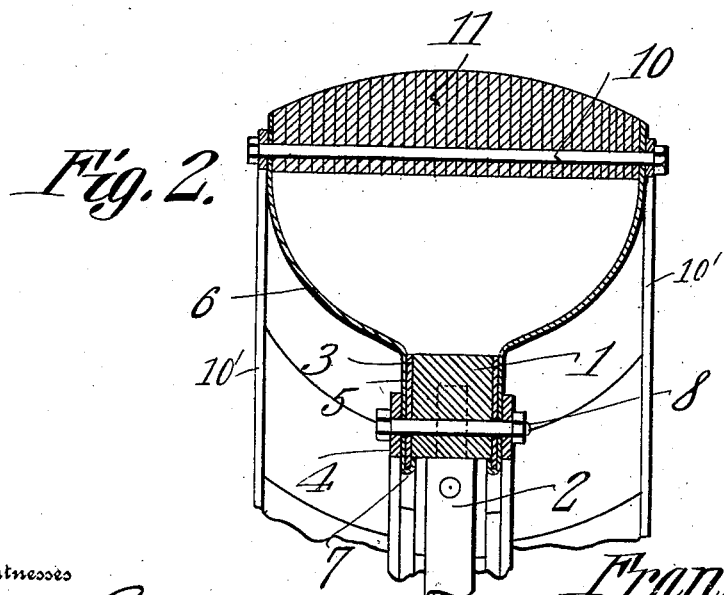

In said drawings: Figure 1 is a side elevation of a portion of a tire embodying the present improvements. Fig. 2 is a transverse section on the line A—B, Fig. 1, and showing a portion of the wheel rim and one of the spokes.

Referring to the figures by characters of reference, 1 designates a wheel rim which may be of wood and mounted on spokes 2 of the usual or any preferred construction. A wear ring 3 of metal is secured upon each side of the rim 1 and a clamping ring 4 is located at each side of the rim and held out of contact with the ring 3 by plates 5 formed of spring metal and having their outer ends bowed laterally, as shown at 6. This bowed portion is located beyond the periphery of the rim 1. The inner edge of each plate 5 is preferably turned inwardly into engagement with the corresponding edge of the adjoining ring 3 and as shown at 7, the said ring 3 and the plates 5 being thus positively held against relative radial movement. Bolts 8 or the like extend transversely through the rings 3 and 4 and through the cutaway corners 9 of plates 5, these bolts serving to clamp the plates 5 between the rings 3 and 4. It is to be understood of course, that the various plates abut so as to be incapable of slipping one over the other but the bolts 8 constitute means for preventing annular movement of the plates.

The outer ends of opposed plates are connected by transversely extending bolts 10 which also project transversely through facing bands or rings 10′ and through the tire tread 11, which, as shown in Fig. 2, may be made up of a plurality of strips of leather or the like placed close together and each extending either entirely or partly around the wheel. The outer surface of the tread produced by these strips may be rounded transversely.

When the tire herein described is in use, the bowed portions 6 of the plates 5 act as springs to permit a yielding movement of the tread portion of the tire and an elastic wheel is thus produced which will travel as smoothly as an ordinary wheel utilizing a pneumatic tire. It will be noted too, that the tire is not unsightly in appearance and any portion thereof can be readily removed for the purpose of repairing or replacing it.

Obviously, various changes may be made in the construction and arrangement of the parts without departing from the spirit or sacrificing any of the advantages of the invention.

What is claimed is:

1. A vehicle tire consisting of opposed series of segmental spring plates, each plate having a laterally bowed outer portion and an inwardly extended rim engaging portion at its inner end, a tread interposed between and supported by the plates, and means extending between and clamping upon the plates for holding them against lateral and annular movement.

2. The combination with a wheel rim and rings secured upon opposite sides thereof, of abutting spring plates bearing upon the rings and extending beyond the rim, the outer ends of said plates being extended laterally and the inner ends thereof being in engagement with the rings, means for clamping the plates upon the rings, and a tread interposed between and secured to the outer ends of the plates.

3. The combination with a wheel rim and rings secured on opposite faces thereof, of segmental abutting spring plates upon the rings and having inwardly turned inner ends engaging the rings and laterally bowed outer ends projecting beyond the rim, means for binding the plates upon the rings, and a tread secured between the bowed portions of the plates.

4. The combination with a wheel rim and rings upon opposite faces thereof, of abutting segmental spring plates upon the rings and having laterally bowed outer ends projecting beyond the rim and inwardly extended inner ends engaging the rings, clamping rings extending across the plates, means for securing the rings to the rim, said plates being cut away to receive said securing means therebetween, and a tread secured between the bowed portions of the plates.

5. A wheel tire consisting of a plurality of segmental spring plates having outwardly bowed outer ends, a wheel rim, coöperating means upon the rim and plates for holding the plates against lateral and annular movement, a plurality of annular contacting strips interposed between and extending beyond the outer ends of the plates, and means extending transversely through the strips and plates for holding them together, said strips constituting the wheel tread.

In testimony that I claim the foregoing as my own, I have hereto affixed my signature in the presence of two witnesses.

FRANK MODLIN.

Witnesses:
JOHN M. MCDONALD,
H. P. FRENCH.